UNITED STATES PATENT OFFICE.

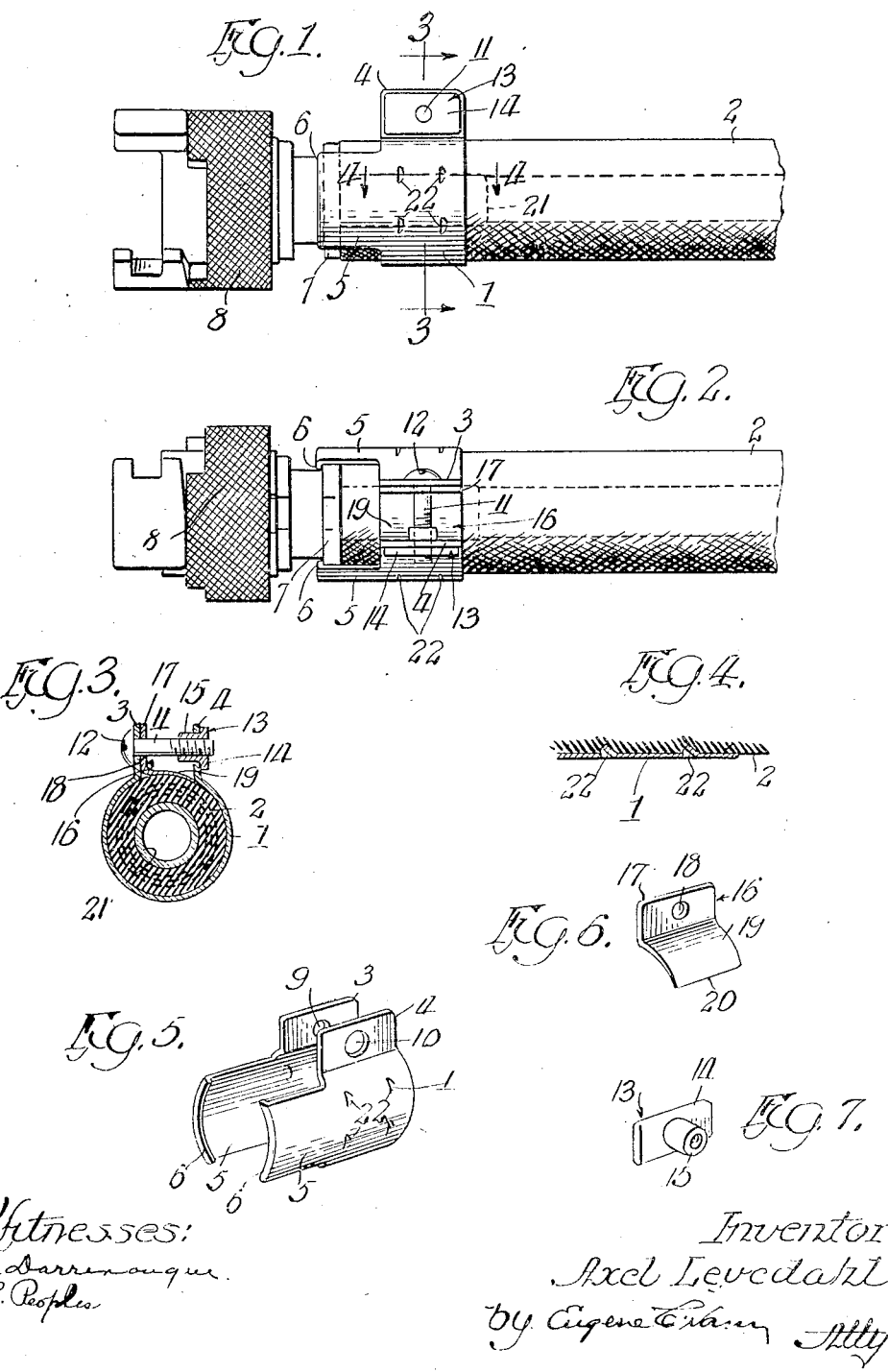

AXEL LEVEDAHL, OF AURORA, ILLINOIS, ASSIGNOR TO INDEPENDENT PNEUMATIC TOOL COMPANY, OF CHICAGO, ILLINOIS, A CORPORATION OF DELAWARE.

HOSE-CLAMP.

1,354,669.  Specification of Letters Patent.  Patented Oct. 5, 1920.

Application filed July 30, 1919. Serial No. 314,376.

*To all whom it may concern:*

Be it known that I, AXEL LEVEDAHL, a citizen of the United States, residing at Aurora, in the county of Kane and State of Illinois, have invented new and useful Improvements in Hose-Clamps, of which the following is a specification.

This invention relates to hose clamps.

Among the objects of the invention is to provide a hose clamp having a one-piece tubular body portion split longitudinally and having a plurality of laterally extending lugs with inturned edges to engage over a rib on the part to be clamped to the end of the hose, and use only one fastening member for the clamp. A further object of the invention is to provide the clamp body with inwardly extending barbs which engage the hose and prevent slipping of the clamp thereon; and, further, to provide a separate filler piece having the same width as the clamp body and completing the contour thereof between the spaced ends of the same, so that a continuous pressure circumferentially of the clamp may be placed on the hose in tightening up the fastening member, and, further, have such pressure evenly divided the full width of the clamp body between the separated ends thereof. A further object of the invention is to provide a clamp nut having a long screw-threaded surface so that the clamp screw will screw up at right-angles thereto and have the clamp screw engage the nut between the separated ends of the clamp body so that a relatively short clamp screw may be used. Other and further objects of my invention will appear from the following specification, taken in connection with the accompanying drawings, in which—

Figure 1 is a side elevational view of a hose clamp constructed in accordance with my invention and shown applied to the end of a hose and clamping one member of a hose coupling thereto;

Fig. 2 is a top plan view of the parts shown in Fig. 1;

Fig. 3 is a transverse sectional view taken on line 3—3 of Fig. 1;

Fig. 4 is a fragmentary longitudinal sectional view taken on line 4—4 of Fig. 1 and showing several of the inwardly projecting barbs provided on the body of the clamp; and Figs. 5, 6, and 7 are perspective views, respectively, of the body of the clamp, the filler piece, and the clamp nut.

A hose clamp of my invention comprises a tubular body portion 1, made in one piece and of sheet metal and adapted to be clamped about the end of a hose 2. The body portion 1 is split longitudinally at one point in its circumference and is provided at its ends with outwardly projecting flanges 3, 4. Said flanges 3, 4 have substantially the same height and length and are spaced apart and substantially parallel. Projecting laterally from one side of said body portion 1 are a plurality of lugs 5, 5 having the same length and width and provided at their forward or free ends with inturned edges 6, 6 to engage over an annular flange 7 on the coupling or other member 8 clamped to the hose 2. The flanges 3, 4 are provided with alined holes 9, 10, the former being large enough to permit the shank of a clamp screw 11 to be inserted therethrough. Said clamp screw 11 extends between the flanges 3, 4 with its head 12 against the outside of the flange 3. The screw-threaded end of the clamp screw 11 engages a nut 13 having a flat rectangular head 14, from one side of which projects a hub 15, as shown in Fig. 7, and which hub is inserted through the hole 10 to extend toward the flange 3 and in position to receive the threaded end of the clamp screw. The hole 10 is made large enough for the hub 15. The head 14 of the nut engages the outside of the flange 4 and has such dimensions as to engage the clamp body 1 and hold the nut from turning. The hub 15 terminates short of the flange 3 but meets the screw before it reaches the flange 4 and prevents the screw from coming into contact with the flange 4. The nut 13 is provided with a screw thread extending through its hub 15 and the portion of the head joined therewith, thereby providing a long threaded surface permitting the clamp screw to screw up at right-angles to the nut and place pressure on the clamp at the bases of the flanges 3, 4. The hub 15 meeting the clamp screw 11 between the flanges 3, 4 allows an earlier connection between the parts, and, further, enables a shorter clamp screw to be used, thereby giving the clamp a neater appearance.

Removably inserted between the flanges 3, 4 is a filler piece 16, preferably made of sheet metal and separate from the body portion of the clamp. It is given the shape shown in Figs. 3 and 6, and has an end flange 17 to engage against the inside of the flange 3. Said flange 17 is provided with a hole 18, which registers with the hole 9 and through which the clamp screw 11 extends. The remaining portion 19 of the filler piece extends laterally from the base of the flange 17, and has the same width as the clamp body and the same contour as the outer surface of the hose, with its edge 20 thinned to approximately a knife edge to slide readily between the clamp body and the hose 2, as shown in Fig. 3. When the filler piece 16 is in place, its flange 17 bears against the inside of the flange 3 and has its lower edge or base against the hose 2, thereby supporting the flange 3 and holding the same from bending inward in the screwing up of the clamp screw 11. The portion 19 bears against the hose 2 from the flange 3 to and beyond the flange 4, thereby covering the portion of the hose not covered by the clamp body 1 and permitting a continuous pressure circumferentially of the clamp and the full width thereof to be put on the hose in the screwing up of the clamp screw 11. The part 8 is provided with a hollow tubular portion or stem 21, which is inserted into the hose 2 from its end and against which the clamp described and shown clamps by compression the portion of the hose encircled by the clamp. By making the clamp body in one piece, the application of the clamp to and its removal from the end of the hose is facilitated, and, further, but one clamp screw is required. Moreover, in providing a separate filler piece, the same may have the same width as the clamp body and cover the part of the hose under the gap between the flanges 3, 4, so that pressure on such part will be evenly divided and be the full width of the clamp body.

The body portion 1 is also provided with a plurality of inwardly projecting barbs 22, 22 formed by forcing portions of the metal inward, said barbs being embedded in the hose when the clamp is tightened about the same and holding the clamp from movement on the hose. In applying the clamp to the hose, the clamp screw 11 and filler piece 16 are first removed, and the clamp body applied about the hose with the inturned edges 6 of the lugs 5, 5 engaging over the rib 7 of the part 8. Then the filler piece and clamp screw are applied and the latter screwed up to place sufficient pressure on the hose for clamping the part 8 thereto.

While I have shown and described in detail one form of hose clamp embodying the features of my invention, it is of course to be understood that the various details of construction and arrangement of parts shown may be variously changed and modified without departing from the spirit and scope of my invention.

I claim as my invention:

1. A hose clamp, comprising a one-piece tubular body portion split longitudinally at one point only and having a plurality of lugs extending from said body portion from one side thereof and having their forward ends disconnected from each other and having inturned edges, said body portion having its ends at the line of severance bent outward to provide a single set of flanges, and a single fastening means extending between and engaging said flanges to clamp the body portion about the end of a hose.

2. A hose clamp, comprising a one-piece tubular body portion split longitudinally and having a plurality of laterally extending lugs provided at their forward ends with inturned edges, said body portion having its ends bent outward to provide flanges, a separate filler piece removably inserted between said flanges and having a portion extending between the same at the bases thereof and completing the contour of the body portion between said flanges, and fastening means engaging said flanges and said filler piece for clamping the body portion about the end of a hose.

3. A hose clamp, comprising a one-piece tubular body portion split longitudinally and having a plurality of laterally extending lugs provided at their forward ends with inturned edges, said body portion having its ends bent outward to provide flanges, a separate filler piece removably inserted between said flanges and having a portion extending between the same at the bases thereof and completing the contour of said body portion between said flanges, said filler piece having an end thereof extending beneath the body portion at one of said flanges, and fastening means engaging said flanges and said filler piece for clamping the body portion about the end of a hose.

4. A hose clamp, comprising a one-piece tubular body portion split longitudinally and having a plurality of laterally extending lugs provided at their forward ends with inturned edges, said body portion having its ends bent outward to provide flanges, a separate filler piece removably inserted between said flanges and having a portion extending between the same at the bases thereof and completing the contour of said body portion between said flanges, said filler piece having a thinned edge extending beneath said body portion at one of said flanges, and fastening means engaging said flanges and said filler piece for clamping the body portion about the end of a hose.

5. A hose clamp, comprising a one-piece tubular body portion split longitudinally and having a plurality of laterally extending lugs provided at their forward ends with inturned edges, said body portion having its ends bent outward to provide flanges, a separate filler piece removably inserted between said flanges and having one end thereof bent outward to engage against one of the flanges of said body portion, said filler piece having a portion extending between the flanges at the bases thereof and completing the contour of the body portion between said flanges, a clamp nut applied against one of said flanges and having a hub extending inwardly therethrough, said nut having a rectangular head for holding the nut against rotation, and a clamp screw inserted through the other flange of said body portion and the outwardly bent end of the filler piece and engaging the hub of the nut for clamping the body portion about the end of a hose.

6. A hose clamp, comprising a one-piece tubular body portion split longitudinally at one point only and having its ends bent outward to provide flanges, a separate filler piece removably inserted between said flanges and having a portion extending between the flanges at the bases thereof to complete the contour of the body portion between the flanges, said filler piece having one end extending beneath the body portion at one of said flanges and the other end provided with an outwardly extending flange to engage against the other flange of said body portion, and fastening means engaging all of said flanges for clamping the body portion about a hose.

7. A hose clamp, comprising a one-piece tubular body portion split longitudinally and having its ends bent outward to provide flanges, a clamp nut applied against the outside of one of said flanges and having a threaded hub extending therethrough toward the other of said flanges, and a clamp screw extending through the last named flange and engaging said hub.

8. A hose clamp, comprising a one-piece tubular body portion split longitudinally at one point only and having its ends bent outward to provide flanges, a separate filler piece removably inserted between said flanges and having a portion extending between the flanges at the bases thereof to complete the contour of the body portion between the flanges, said filler piece having one end extending beneath the body portion at one of said flanges and the other end provided with an outwardly extending flange to engage against the other flange of said body portion, a clamp nut applied against the outside of one of the flanges of the body portion and having a threaded hub projecting therethrough, and a clamp screw inserted through the other flange of said body portion and the flange of said filler piece and engaging said hub for clamping the body portion about a hose.

In testimony that I claim the foregoing as my invention, I affix my signature this 26 day of July, A. D. 1919.

AXEL LEVEDAHL.